(12) United States Patent
Takagi

(10) Patent No.: US 7,950,431 B2
(45) Date of Patent: May 31, 2011

(54) PNEUMATIC BIAS TIRE

(75) Inventor: Hazime Takagi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 833 days.

(21) Appl. No.: 11/741,445

(22) Filed: Apr. 27, 2007

(65) Prior Publication Data

US 2007/0199640 A1 Aug. 30, 2007

Related U.S. Application Data

(62) Division of application No. 10/501,990, filed on Jul. 21, 2004, now abandoned.

(30) Foreign Application Priority Data

Jan. 22, 2002 (JP) .................................. 2002-13082

(51) Int. Cl.
*B60C 9/06* (2006.01)
*B60C 9/04* (2006.01)
*B60C 9/02* (2006.01)

(52) U.S. Cl. ........................................ 152/559; 152/549

(58) Field of Classification Search .................. 152/559, 152/549

See application file for complete search history.

(56) References Cited

U.S. PATENT DOCUMENTS

| 4,442,880 A | 4/1984 | Takahashi |
| 4,779,660 A | 10/1988 | Tsurunaga |
| 2005/0072508 A1* | 4/2005 | Takagi .......................... 152/559 |

FOREIGN PATENT DOCUMENTS

| JP | 56-82605 A | 7/1981 |
| JP | 57-191102 A | 11/1982 |
| JP | 62-194906 A | 8/1987 |
| JP | 6-191214 A | 7/1994 |
| JP | 6-199104 A | 7/1994 |
| JP | 11-170821 A | 6/1999 |

* cited by examiner

*Primary Examiner* — Adrienne C Johnstone
(74) *Attorney, Agent, or Firm* — Sughrue Mion, PLLC

(57) ABSTRACT

In a heavy duty pneumatic bias tire having a ply rating of not less than 58 and an aspect ratio of not more than 80%, a rubber volume as the product of the sum of each distance between ply cords in an inner mutually adjoining carcass ply per 50 mm, the sum of each distance between ply cords in an outer mutually adjoining carcass ply per 50 mm, and a distance between ply cords of mutually adjoining inner and outer carcass plies with respect to three or more inside carcass plies of an innermost ply group in at least a portion corresponding to a position of a maximum tire width is 500-1350 mm$^3$, more preferably 700-1000 mm$^3$.

4 Claims, 2 Drawing Sheets

PNEUMATIC BIAS TIRE

TECHNICAL FIELD

This is a division of application Ser. No. 10/501,990 filed Jul. 21, 2004 now abandoned, which is a national stage application of International Application No. PCT/JP03/00564 filed Jan. 22, 2003. The entire disclosure of the prior application, application Ser. No. 10/501,990 is hereby incorporated by reference.

This invention relates to a pneumatic bias tire suitable for use in construction vehicles such as loader and the like, and particularly proposes a technique for effectively preventing separation failure between plies of a carcass caused in a portion corresponding to a maximum width position of the tire resulted from the running of the tire under high loading.

BACKGROUND ART

In this type of the conventional pneumatic bias tire comprising plural pairs of bead cores and plural carcass ply groups corresponding to the bead core pair number, carcass plies of rubberized ply cords constituting each group being wound around each bead core, it is common that when the number of ply cords per 50 mm in at least three inside carcass plies of an innermost carcass ply group is Np, a rubber gauge between the ply cords of the adjoining carcass plies is Tp (mm), a diameter of the ply cord is Dp (mm), the number of ply cords per 50 mm in the carcass ply of the other carcass ply groups is Nq, a rubber gauge between the ply cords of the adjoining carcass plies is Tq (mm) and a diameter of the ply cord is Dq (mm), there are made Np=50, Nq=51 and Np/Nq=0.98 but also Tp/Dp=1.3, Tq/Dq=0.8 and (Tp/Dp)/(Tq/Dq)=1.6.

Moreover, the term "rubber gauge between ply cords of adjoining carcass plies" used throughout the specification means a total thickness of coating rubber sandwiched between the ply cords of mutually laminated carcass plies and rubber which may be separately interposed between the carcass plies.

In such a conventional tire, however, it tends to increase a ratio of causing separation failure between one to three inside carcass plies in the innermost carcass ply group, more directly separation failure of the ply cord from the coating rubber due to the increase of strain in a portion of the carcass corresponding to a position of the maximum tire width accompanied with increases of load and torque for the construction vehicle or the like in recent years.

Namely, in the loader, a maximum width portion of the tire having a thinnest thickness is particularly subjected to a large strain by increasing the load accompanied with the recently large bucketing and the output accompanied with the increase of digging force. Particularly, in the bending deformation of the tire side portion under a large load, the innermost first to third carcass plies are located at a compression side of the bending and the carcass ply as a tension-resistant member is largely distorted by subjecting to compression force instead of tensile force, so that shearing strain between the carcass plies becomes large to cause the separation failure of the ply cord from the coating rubber and hence separation failure between the plies resulted therefrom.

In connection with such problems, JP-A-57-191102 proposes a technique wherein on the assumption that the twisting number of the ply cord in the outermost and innermost carcass ply groups is made larger than the twisting number of the ply cord in the middle carcass ply group to enhance compression strength in these carcass ply groups, the amount of rubber existing between the ply cords is increased for preventing the peeling of the ply cord from the coating rubber due to the increase of the cord twisting number, whereby the concentration of shearing strain is controlled to prevent cracking produced at an interface between the cord and the rubber and hence prevent the separation failure.

Even in such a tire, however, the separation failure of the ply cord from the coating rubber can not be sufficiently prevented when compression force applied to the inner carcass ply is made larger by the bending deformation of the tire side portion as in the bias tire having plural pairs of bead cores obliged to increase the thickness in the portion corresponding to the maximum tire width and also having a ply rating of not less than 58 used under a high load, or when an aspect ratio of the tire is not more than 80% and the bending deformation amount of the tire side portion is made relatively large due to the lowering of the height of the tire side portion or the like.

The invention is to solve the problems of the conventional techniques and to provide a pneumatic bias tire capable of effectively preventing the separation failure between the carcass plies even in the large bending deformation of the tire side portion under an action of a high load.

DISCLOSURE OF THE INVENTION

The pneumatic bias tire according to the invention comprises plural pairs of bead cores and plural carcass ply groups corresponding to the number of bead core pairs, carcass plies of ply cords coated with a coating rubber constituting each group being wound around each bead core, and has a ply rating of not less than 58 and an aspect ratio of not more than 80%, in which a rubber volume as the product of the sum of each distance between ply cords in an inner mutually adjoining carcass ply per 50 mm, the sum of each distance between ply cords in an outer mutually adjoining carcass ply per 50 mm, and a distance between ply cords of mutually adjoining inner and outer carcass plies with respect to three or more inside carcass plies of an innermost carcass ply group in at least a portion corresponding to a position of a maximum tire width is 500-1350 mm$^3$, more preferably 700-1000 mm$^3$.

The term "maximum tire width" used herein means a maximum distance between sidewalls when the tire is mounted onto an approved rim and inflated under a specified air pressure and removing letters, patterns and the like at a side face of the tire, and the term "portion corresponding to a position of maximum tire width" means a region corresponding to about 3-5% of a tire section height.

Moreover, the term "approved rim" means a rim defined according to the following standard, and the term "specified air pressure" means an air pressure defined in correspondence with a maximum load capacity according to the following standard, and the maximum load capacity means an acceptable maximum mass applied to the tire according to the following standard.

The standard is decided by an industrial standard effective for an area producing or using tires. For instance, it is "YEAR BOOK of The TIRE and RIM ASSOCIATION INC. in USA, "STANDARD MANUAL of The European Tyre and Rim Technical Organization" in Europe, and "JATMA YEAR BOOK" of The Japan Automobile Tire Manufacturers Association Inc. in Japan.

When the rubber volume between the ply cords is selected within the above range, the separation failure of the ply cord and hence separation failure between the carcass plies can be effectively prevented even if the thickness of the maximum tire width portion becomes relatively thick or the bending deformation amount of the tire side portion becomes large.

That is, when the rubber volume is less than 500 mm³, a strained stress between the ply cord and the coating rubber can not be effectively mitigated, while when it exceeds 1350 mm³, the function of mitigating the strained stress between the carcass plies can be developed, but the thickness of the maximum tire width portion is made relatively thick to increase compression strain in the innermost carcass ply group and the effect of stress mitigation is lessened and hence the effective prevention of the separation failure between plies becomes difficult.

In such a tire, it is preferable that a peel strength index represented by the following equation among at least three inside carcass plies in the innermost carcass ply group is made 1.3 times or more than that among the carcass plies in the other carcass ply groups. More preferably, an upper limit of the peel strength index is 1.6.

The peel strength index F is represented by an equation:

$$F=6.8\times(50/N-D)+3.6\times T+9.7$$

wherein N: number of ply cords per 50 mm
D: diameter of ply cord (mm)
T: rubber gauge between ply cords of adjoining carcass plies. In this case, a group that carcass ply(s) is not wound around the bead core or so-called down ply group is not included in the other carcass ply group.

In order to enhance the peel strength between the carcass plies, it is effective that the number of ply cords arranged per 50 mm (hereinafter referred to as end count) is decreased to widen a rubber width between cords in the same carcass ply to mitigate the concentration of the strained stress between the ply cords accompanied with the deformation of the tire side portion and that the rubber gauge between the laminated carcass plies is thickened to mitigate the concentration of the strained stress. Considering these facts, the peel strength index F can be represented by an equation:

$$F=6.8\times(50/N-D)+3.6\times T+9.7$$

wherein N: end count
D: diameter of ply cord (mm)
T: rubber gauge between ply cords of adjoining carcass plies.

When the peel strength index F is made 1.3 times or more among at least three inside carcass plies in the innermost carcass ply group, which is particularly apt to easily cause the separation failure between plies, than that among the carcass plies in the other carcass ply groups, the sufficient separation resistance in use can be ensured.

In other words, when the peel strength index F is less than 1.3 times, particularly not more than 1.25 times, the separation resistance is lacking and there is a fear of causing the separation failure between the plies at a relatively premature time. On the other hand, the upper limit of the peel strength index F is preferable to be 1.6 times.

Moreover, it is possible to enhance the peel strength index by either the end count of ply cords or the rubber gauge between the ply cords in the adjoining carcass plies. However, when only the end count is decreased, it is unavoidable to extremely lower the total strength of the carcass, and also it is difficult to effectively mitigate the strained stress because the rubber gauge between the plies is unchangeable.

On the other hand, when only the rubber gauge between the carcass plies is increased, there is a tendency capable of mitigating the strain between the plies, but as the rubber gauge between the plies exceeds a certain range, the compression strain to the innermost carcass ply group is increased by the increase of the thickness of the maximum tire width portion and it is difficult to expect the sufficient effect of mitigating the stress, and also it is difficult to substantially increase the peel strength index F in connection with no change of the end count.

In the tire according to the invention, it is more preferable to satisfy requirements of Ni=30-40 (cords), No=50-60 (cords), Ni/No=0.6-0.8 and Ti/Di=1.6-2.2, To/Do=0.6-1.0, (Ti/Di)/(To/Do)=1.9-3.55 when an average end count in at least three inside carcass plies of the innermost carcass ply group is Ni, a rubber gauge between the ply cords of the adjoining carcass plies is Ti (mm), a diameter of the ply cord is Di (mm), an average end count in the carcass plies of the other carcass ply groups is No, a rubber gauge of the ply cords of the adjoining carcass plies is To (mm) and a diameter of the ply cord is Do (mm).

Thus, the separation resistance of the carcass ply can be advantageously improved without extremely lowering the total strength of the carcass and considerably increasing the thickness of the maximum tire width portion and the like while well balancing the decrease of the end count and the increase of the rubber gauge between the ply cords of the adjoining carcass plies.

That is, when the end count Ni exceeds 40 cords, the expected separation resistance is hardly realized, while when it is less than 30 cords, the lowering of the total strength of the carcass is not denied. Also, when Ti/Di is less than 1.6, it is difficult to sufficiently improve the separation resistance, while when it exceeds 2.2, the total thickness of the tire side portion becomes thicker and the separation failure of the carcass ply fatigue breakage of the ply cord and the like are apt to be easily caused by the increase of the compression strain accompanied with the bending deformation of the side portion itself rather than the function of mitigating the strained stress.

BEST MODE FOR CARRYING OUT THE INVENTION

Figure 1:
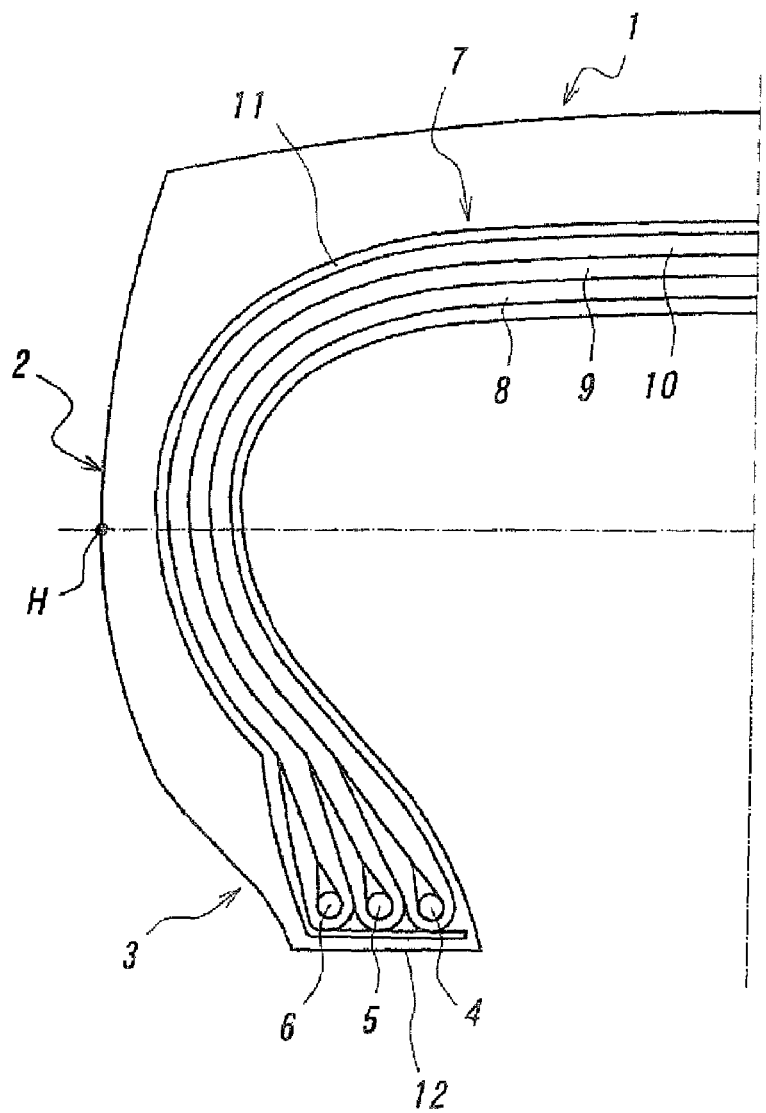
FIG. 1 is a cross section view of a half portion of an embodiment of the tire according to the invention.

In FIG. 1 showing a half portion of an embodiment of the tire according to the invention, numeral 1 is a tread portion, numeral 2 a sidewall portion continuing to each side part of the tread portion 1 and extending inward in a radial direction, and numeral 3 a bead portion located at an inner peripheral side of the sidewall portion 2.

In this embodiment, three pairs of bead cores 4, 5, 6 are arranged in each of the bead portions 3, and a carcass constituting a skeleton structure of the tire toroidally extends between the bead cores and is formed with inner to outer three carcass ply groups 8, 9, 10 and one down ply group 11. Each of the carcass ply groups 8, 9, 10 other than the down ply group 11 is constructed by winding side portions of plural carcass plies each made of ply cords coated with a coating rubber around each of the bead cores 4, 5, 6 from an inside toward an outside in a widthwise direction of the tire. Moreover, the down ply group 11 located at an outermost side in the figure is constructed by arranging side portions of plural carcass plies each made of ply cords coated with a coating rubber along a bead base 12 of the tire.

Figure 2:
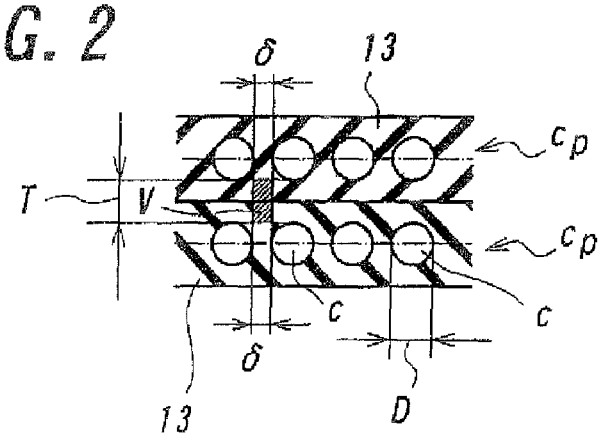
FIG. 2 is an enlarged section view illustrating distances between ply cords in the same ply and between adjoining carcass plies.

In the tire according to the invention having an aspect ratio of not more than 80% and a ply rating of not less than 58, three or more inside carcass plies of an innermost carcass ply group 8 in at least a portion corresponding to a position H of a maximum tire width, which are a compression side in the bending deformation of the sidewall portion 2, satisfy that a rubber volume V as the product of the sum of each distance δ between ply cords in an inner mutually adjoining carcass ply $c_p$ per 50 mm, the sum of each distance δ between ply cords in an outer mutually adjoining carcass ply $c_p$ per 50 mm, and a distance T between ply cords of mutually adjoining inner and outer carcass plies $c_p$ as shown by an enlarged section view in FIG. 2 is within a range of 500-1350 mm³, more preferably 700-1000 mm³.

Figure 3:
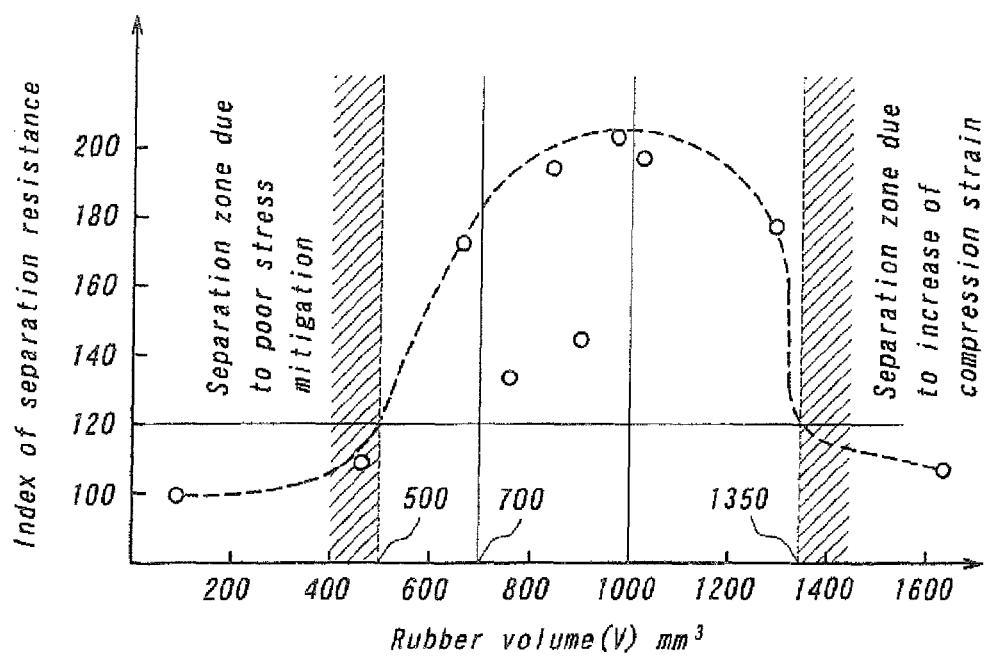
FIG. 3 is a graph showing a relation between rubber volume and separation resistance of a carcass ply.

According to the tire having such a construction, as seen from a graph shown in FIG. 3, the separation failure between the carcass plies can be prevented effectively. That is, when the rubber volume V is less than 500 mm³, the strained stress between the ply cord and the coating rubber can not be sufficiently mitigated, while when it exceeds 1350 mm³, even if the strained stress between the carcass plies can be mitigated, the thickness of the carcass itself is increased to increase the compression strain at the innermost side by the bending deformation, so that it is difficult to effectively control the separation failure. At this moment, the reason why the index of separation resistance of 120 is a standard judging the separation resistance is due to the fact that it is difficult to ensure the advantage in market unless the index value is not less than 120.

Further, in addition to the above, the peel strength index F among three or more inside carcass plies in the innermost carcass ply group 8 represented by the equation of:

$$F=6.8\times(50/N-D)+3.6\times T+9.7$$

wherein N: end count
D: diameter of ply cord (mm)
T: rubber gauge between ply cords of adjoining carcass plies, is 1.3 times or more than that in the other carcass ply groups 9, 10. Moreover, the upper limit of this index F is preferable to be 1.6 times as previously mentioned.

As shown in FIG. 2, the diameter D of the ply cord means a diameter of a ply cord c embedded in a coating rubber 13 in the carcass ply $c_p$ and the rubber gauge T between the ply cords of the adjoining carcass plies $c_p$ means a thickness of the coating rubber 13 corresponding to a distance between ply cords of mutually laminated carcass plies $c_p$ as previously mentioned.

When the carcass plies are mutually laminated by interposing another rubber therebetween, a thickness of this rubber is included in the rubber gauge T.

According to the tire having such a construction, there can be effectively prevented the separation failure between the inside carcass plies particularly subjected to a large compression strain at the portion corresponding to the position H of the maximum tire width having a thinnest tire thickness in the bending deformation of the sidewall portion 2 under an action of a high load.

In such a tire, it is more preferable to satisfy requirements of Ni=30-40 (cords), No=50-60 (cords), Ni/No=0.6-0.8 and Ti/Di=1.6-2.2, To/Do=0.6-1.0, (Ti/Di)/(To/Do)=1.9-3.55 when an average end count in at least three inside carcass plies $c_p$ of the innermost carcass ply group 8 is Ni, a rubber gauge between the ply cords of the adjoining carcass plies is Ti (mm), a diameter of the ply cord is Di (mm), an average end count in the carcass plies $c_p$ of the other carcass ply groups 9, 10 is No, a rubber gauge of the ply cords of the adjoining carcass plies is To (mm) and a diameter of the ply cord is Do (mm).

In this case, the separation failure of the carcass ply $c_p$ can be more advantageously prevented by well balancing the decrease of the end count and the increase of the rubber gauge between the ply cords of the adjoining carcass plies.

EXAMPLE

As a pneumatic bias tire for construction vehicle having a tire size of 45/65-45 58PR, there are provided invention tires and conventional tire in which three pairs of bead cores are arranged as shown in FIG. 1, and each of innermost to outermost carcass ply groups is comprised of 14 carcass plies each containing ply cords made of nylon-66 of 1260 denier and a down ply group is comprised of 6 carcass plies each containing the same ply cords, and crossing angles of the ply cords in the inside, middle and outside carcass ply groups with respect to an equatorial plane of the tire are 54°, 56° and 58°, respectively, and the same crossing angle of the ply cord in the down ply group is 55°, and an end count, a diameter of the ply cord and the like are changed as shown in Table 1. Each of these tires is subjected to an actual running test on a vehicle every 30 tires to measure an average time required for the occurrence of separation failure between carcass plies located at an inside in a tire side portion to thereby obtain results as shown by a durability index in a lowermost column of Table 1.

TABLE 1

|  | Conventional tire | Invention tire | | | | | | | Comparative tire | |
|---|---|---|---|---|---|---|---|---|---|---|
|  |  | 1 | 2 | 3 | 4 | 5 | 6 | 7 | 1 | 2 |
| V (rubber volume mm³) | 140 | 655 | 878 | 1347 | 1005 | 985 | 760 | 900 | 480 | 1626 |
| Ni (cords/50 mm) | 50.5 | 40 | 40 | 30 | 30 | 35 | 50 | 28 | 42.0 | 28 |
| No (cords/50 mm) | 51.0 | 50.8 | 50.8 | 50.8 | 50.7 | 50.7 | 50.7 | 51.0 | 51.0 | 51.0 |
| Ni/No | 0.99 | 0.79 | 0.79 | 0.59 | 0.59 | 0.69 | 0.99 | 0.55 | 0.82 | 0.55 |
| Ti (mm) | 0.38 | 1.00 | 1.34 | 1.34 | 1.00 | 1.2 | 2.00 | 0.38 | 0.90 | 1.50 |
| To (mm) | 0.38 | 0.38 | 0.38 | 0.38 | 0.38 | 0.38 | 0.38 | 0.38 | 0.38 | 0.38 |
| Ti/Di | 0.62 | 1.64 | 2.20 | 2.20 | 1.64 | 1.97 | 3.28 | 0.62 | 1.48 | 2.46 |
| To/Do | 0.62 | 0.62 | 0.62 | 0.62 | 0.62 | 0.62 | 0.62 | 0.62 | 0.62 | 0.62 |
| (Ti/Di)/(To/Do) | 1.00 | 2.63 | 3.53 | 3.53 | 2.63 | 3.16 | 5.26 | 1.00 | 2.37 | 3.95 |
| Ratio of peel strength in innermost plies (index) | 100 | 130 | 139 | 160 | 151 | 144 | 144 | 150 | 124 | 170 |
| Ratio of strain in innermost plies (index) | 100 | 105 | 108 | 108 | 105 | 107 | 113 | 101 | 105 | 109 |

TABLE 1-continued

|  | Conventional tire | Invention tire | | | | | | | Comparative tire | |
|---|---|---|---|---|---|---|---|---|---|---|
|  |  | 1 | 2 | 3 | 4 | 5 | 6 | 7 | 1 | 2 |
| Casing strength at break (index) | 100 | 97.3 | 97.3 | 95.0 | 94.8 | 96 | 99.4 | 94.9 | 98 | 95 |
| Durability index up to troubles | 100 | 166 | 186 | 171 | 189 | 194 | 129 | 140 | 106 | 114 |

As seen from Table 1, the invention tires can largely improve the durability of the carcass as compared with the conventional tire and comparative tires.

INDUSTRIAL APPLICABILITY

As mentioned above, according to the invention, the rubber volume between the ply cords among three or more inside carcass plies in the innermost carcass ply group particularly located at a portion corresponding to a position of a maximum tire width is 500-1350 mm$^3$, so that the separation failure between the carcass plies at the portion being a compression side in the bending deformation of the tire side portion under an action of a high load can be effectively prevented to largely improve the durability of the carcass.

The invention claimed is:

1. A pneumatic bias tire comprising plural pairs of bead cores and plural carcass ply groups corresponding to the number of bead core pairs, carcass plies of ply cords coated with a coating rubber constituting each group being wound around each corresponding bead core pair, and having a ply rating of not less than 58 and an aspect ratio of not more than 80%, in which a rubber volume as the product of the sum of each distance between ply cords in an inner mutually adjoining carcass ply per 50 mm, the sum of each distance between ply cords in an outer mutually adjoining carcass ply per 50 mm, and a distance between ply cords of mutually adjoining inner and outer carcass plies with respect to three or more inside carcass plies of an innermost carcass ply group in at least a portion corresponding to a position of a maximum tire width is 500-1350 mm$^3$.

2. A pneumatic bias tire according to claim 1, wherein a peel strength index represented by the following equation among at least three inside carcass plies in the innermost carcass ply group is made 1.3 times or more than that among the carcass plies in the other carcass ply groups:

$$F=6.8(50/N-D)+3.6\times T+9.7$$

wherein N=number of ply cords per 50 mm, D=diameter of ply cord in mm, and T=rubber gauge in mm between ply cords of adjoining carcass plies.

3. A pneumatic bias tire according to claim 1, wherein said tire satisfies requirements of Ni=30-40 (cords), No=50-60 (cords), Ni/No=0.6-0.8 and Ti/Di=1.6-2.2, To/Do=0.6-1.0, (Ti/Di)/(To/Do)=1.9-3.55 when an average end count per 50 mm in at least three inside carcass plies of the innermost carcass ply group is Ni, a rubber gauge between the ply cords of the adjoining carcass plies is Ti in mm, a diameter of the ply cord is Di in mm, an average end count per 50 mm in the carcass plies of the other carcass ply groups is No, a rubber gauge of the ply cords of the adjoining carcass plies is To in mm and a diameter of the ply cord is Do in mm.

4. A pneumatic bias tire according to claim 2, wherein said tire satisfies requirements of Ni=30-40 (cords), No=50-60 (cords), Ni/No=0.6-0.8 and Ti/Di=1.6-2.2, To/Do=0.6-1.0, (Ti/Di)/(To/Do)=1.9-3.55 when an average end count per 50 mm in at least three inside carcass plies of the innermost carcass ply group is Ni, a rubber gauge between the ply cords of the adjoining carcass plies is Ti in mm, a diameter of the ply cord is Di in mm, an average end count per 50 mm in the carcass plies of the other carcass ply groups is No, a rubber gauge of the ply cords of the adjoining carcass plies is To in mm and a diameter of the ply cord is Do in mm.

* * * * *